Sept. 3, 1940.    F. E. ELLIS, JR    2,213,461
AUTOMOBILE DOOR SUPPORT
Filed Sept. 20, 1939
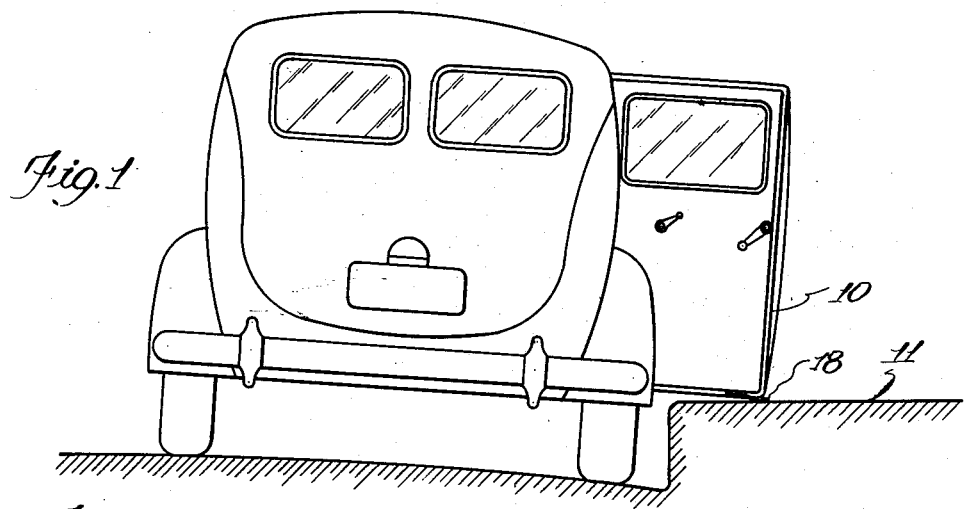
Fig. 1
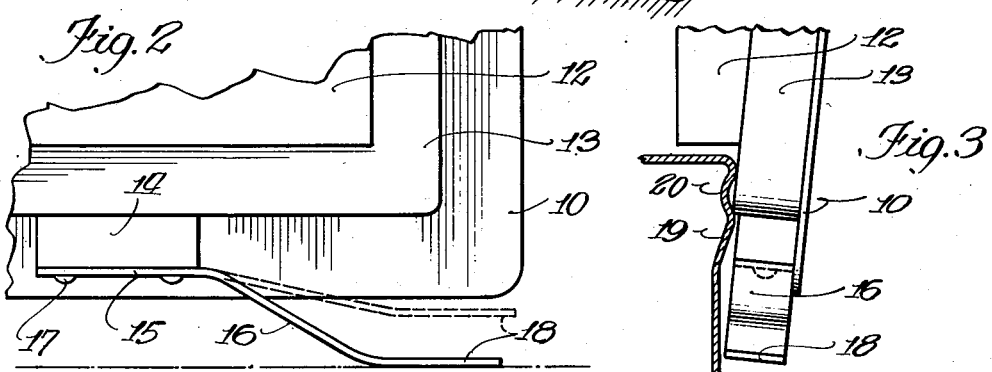
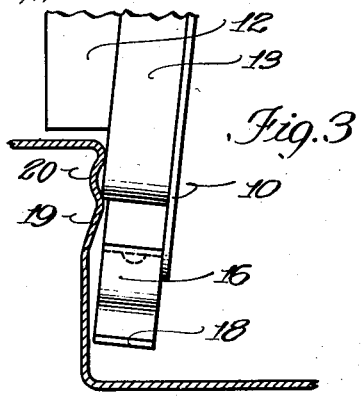
Fig. 2    Fig. 3
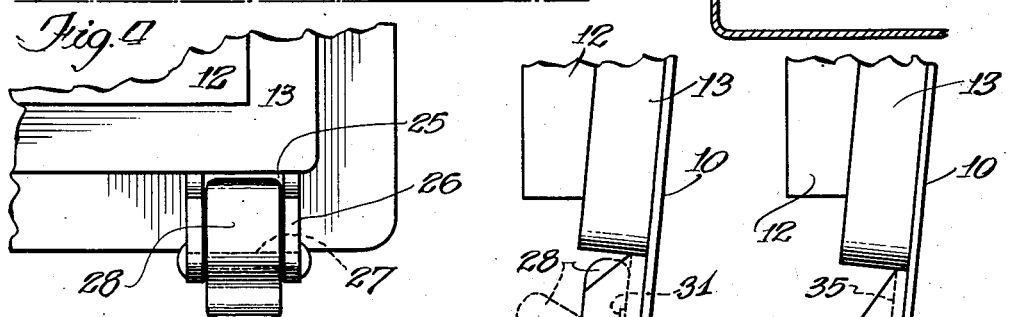
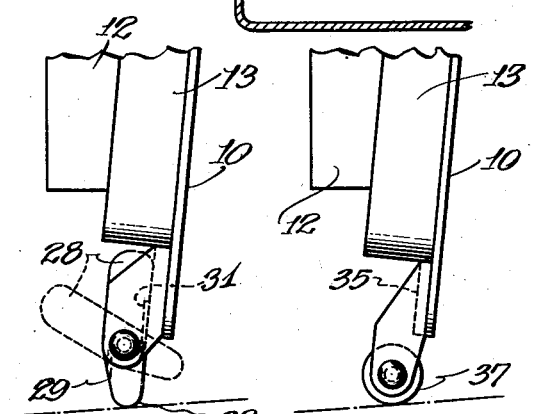
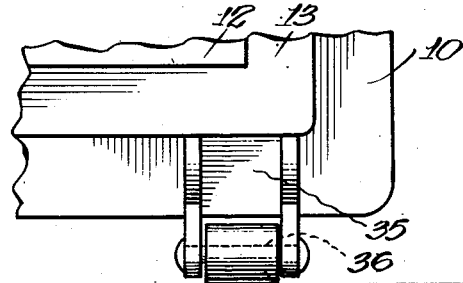
Fig. 4    Fig. 5    Fig. 7
Fig. 6
Inventor:
Frampton E. Ellis Jr.
By: Miles B. Stevens & Co.
Attys.

Patented Sept. 3, 1940

2,213,461

UNITED STATES PATENT OFFICE 2,213,461

AUTOMOBILE DOOR SUPPORT

Frampton E. Ellis, Jr., Chicago, Ill.

Application September 20, 1939, Serial No. 295,829

3 Claims. (Cl. 280—150)

My invention relates to automobile doors, and more particularly to means for supporting the same in a manner to prevent the jamming thereof when opened on a sidewalk or curb, and my main object is to provide a support which enables the door to be closed with little or no difficulty in such event.

A further object of the invention is to provide a support for the above purpose which is yieldable when the door has become engaged with the sidewalk or curb, whereby to relieve the incidental friction when the door is urged in the closing direction and permit the same to continue in such direction.

Another object of the invention is to provide a device for the above purpose which occupies an inconspicuous place within the bottom of the door and is usually not noticeable.

A still further object of the invention is to apply the novel device within the corner space usually found at the bottom of the door, so as to occupy such space and usually require no further clearance when the door is closed.

An additional object of the invention is to design the novel support along lines of extreme simplicity and ruggedness, in order that it may be economically manufactured and serve indefinitely without attention or repair.

With the above objects in view and with any others that may suggest themselves from the description to follow, a better understanding of the invention may be had by reference to the accompanying drawing, in which—

Fig. 1 is a rear elevation of an automobile showing the application of the novel support;

Fig. 2 is an enlarged fragmental view of the inner side of a door, showing one form of the invention;

Fig. 3 is a right-hand side view of the showing in Fig. 2, with a portion of the automobile body in section;

Fig. 4 is a view similar to Fig. 2, showing a second form of the device;

Fig. 5 is a right-hand side view of the showing in Fig. 4;

Fig. 6 is a view similar to Fig. 4, showing a third form of the device; and

Fig. 7 is a right-hand side view of the showing in Fig. 6.

Frequently an automobile is stopped or parked along a curb which is higher than usual, or on a pavement which is so banked that the open door over the sidewalk or curb is almost in contact with the same at the bottom. Where passengers are discharged, the above condition is of no concern, but where passengers enter the automobile the additional weight imposed thereon frequently draws down on the door so that the latter becomes jammed on the sidewalk or curb and incapable of being closed. Such a situation is usually unexpected and causes embarrassment and delay. It has therefore been my intention to equip the door with a simple attachment which makes it easily possible to release and close the door when the above condition occurs.

In accordance with the foregoing, specific reference to the drawing indicates the automobile door at 10, and Fig. 1 shows the same positioned with its bottom close to a sidewalk 11. However, Fig. 2 shows more clearly that one form of the novel support is attached to the internal panel 12 of the door by way of the rubber moulding 13 surrounding the same. Thus, the attachment is in the form of a block 14 to which the shank 15 of an inclined spring blade 16 is secured by screws 17 or other suitable means, the block being secured by these screws to the panel 12, as mentioned, or in any suitable manner, so as to lie within the corner of the door with the moulding 13. The plate 16 terminates with a horizontal portion 18, which is positioned over the sidewalk 11 when the door is open, as shown in Fig. 1. However, when the door has been weighted by receiving passengers, the plate 16 will be tensioned to assume the more obtuse form indicated by dotted lines in Fig. 2. Thus, the plate 16 prevents the door itself from assuming a jamming or frictional contact with the sidewalk; therefore, little effort will be required to close the door, as the blade 16 will readily yield to the action of the door. Fig. 3 shows that the metal sill 19 of the automobile may be indented as indicated at 20 if sufficient clearance is not had for fully closing the door, although the thickness of the rubber moulding is usually ample to permit such clearance.

The form of attachment in Fig. 4 provides a sturdy frame 25 with laterally-spaced arms 26 carrying a cross-pin 27 as a pivot for a block 28. This block has a tapered lower portion 29 which is round at the bottom, as indicated at 30. The normal position of the block 28 is substantially upright, as indicated by full lines in Fig. 5; however, the block may be swung in a counter-clockwise direction as indicated by dotted lines in the same figure. However, a torsion spring 31 is provided to normally retain the block in the upright position. When a door carrying the present form of the device assumes the position of Fig. 1, the release is obtained simply by moving the door in a closing direction, as the block is then forced to yield as described, dragging until the door is closed when it resumes its normal position again.

The third form of the attachment also involves a frame 35 with a cross-pin 36, but a simple roller 37 is journaled on the latter. It follows, as suggested in Fig. 7, that the roller will induce the door to ride to the closed position as the door is urged in the corresponding direction, the roller relieving the door of the incidental friction.

It will be evident from the above description that I have provided a small and inconspicuous attachment for the automobile door which is secluded and out of the way when not in use, but which automatically performs its function in the event that the door is opened and is close to the surface of a sidewalk or curb. Neither form of the attachment requires any manipulation or attention, but may be depended upon to ease the door as the latter is swung in the closing direction, so as to relieve the situation and summarily dispose of the same.

While I have described the three forms of the attachment indicated in the drawing, various further refinements or developments of a minor nature may suggest themselves from time to time, and I consider all such refinements and developments as coming within the scope and spirit of the appended claims.

I claim:

1. A bottom automobile door extension for yieldable ground engagement comprising a spring blade having one portion under the door, means to attach such portion to the door, and another portion freely extended at an inclination from the first-mentioned portion.

2. A bottom automobile door extension for yieldable ground engagement comprising a spring blade having one portion under the bottom edge of the door, means to attach such portion to such edge, and another portion freely extended at an inclination from the first-mentioned portion, the blade extending longitudinally of said edge.

3. A bottom automobile door extension for yieldable ground engagement comprising a spring blade having an initial portion under the door, means to attach such portion to the door, and intermediate portion freely extended at an inclination from the initial portion, and a final portion extending substantially horizontally from the intermediate portion.

FRAMPTON E. ELLIS, Jr.